No. 634,724. Patented Oct. 10, 1899.
C. N. DUTTON.
AIR BRAKE.
(Application filed June 22, 1898.)
(No Model.) 4 Sheets—Sheet 2.

WITNESSES: INVENTOR.
Chauncey N. Dutton,
by J. Snowden Bell,
Att'y.

No. 634,724. Patented Oct. 10, 1899.
C. N. DUTTON.
AIR BRAKE.
(Application filed June 22, 1898.)
(No Model.) 4 Sheets—Sheet 3.

WITNESSES:
INVENTOR.
Chauncey N. Dutton,
by J. Snowden Bell, Att'y.

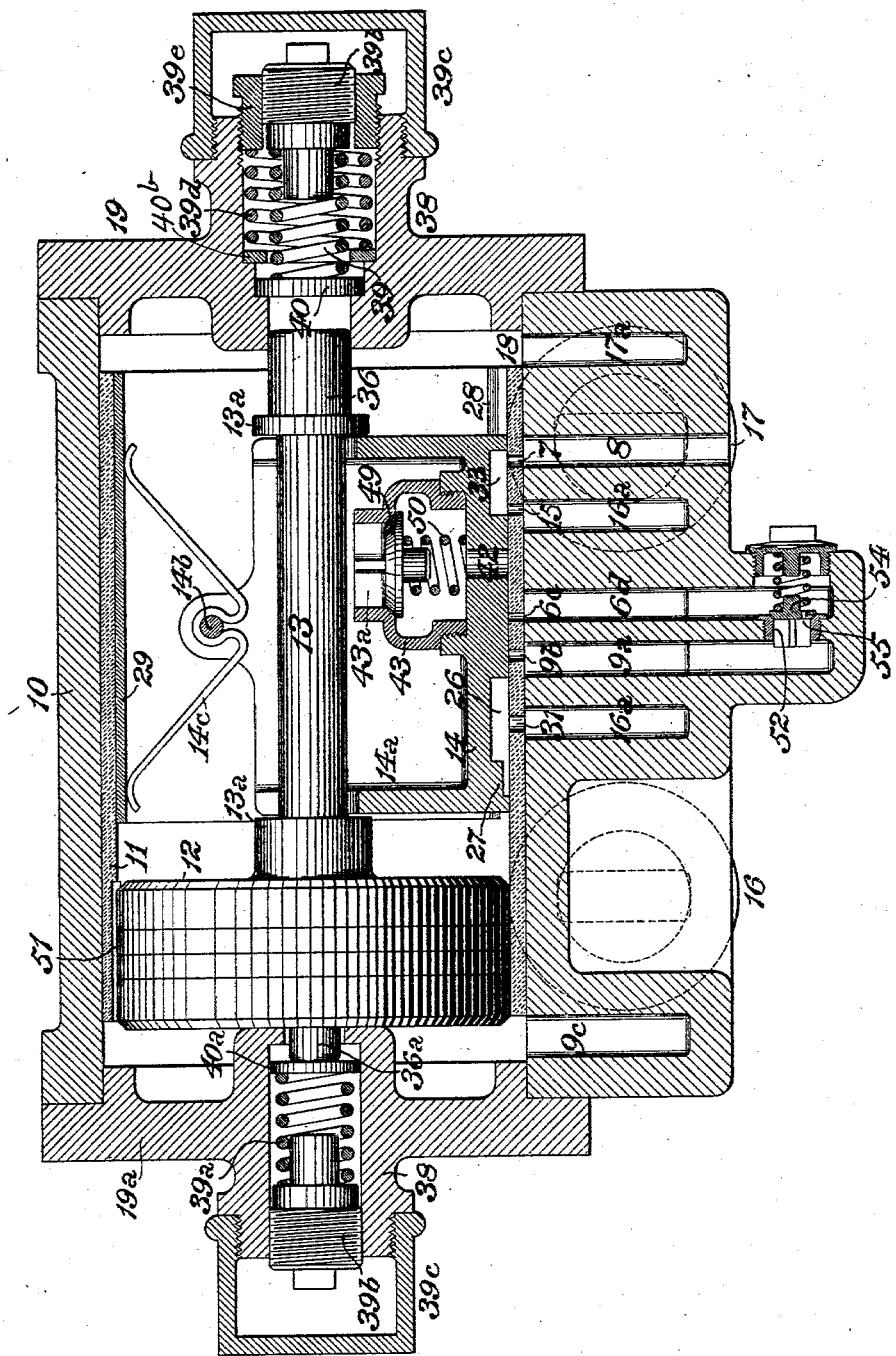

United States Patent Office.

CHAUNCEY N. DUTTON, OF NEW YORK, N. Y.

AIR-BRAKE.

SPECIFICATION forming part of Letters Patent No. 634,724, dated October 10, 1899.

Application filed June 22, 1898. Serial No. 684,126. (No model.)

*To all whom it may concern:*

Be it known that I, CHAUNCEY N. DUTTON, of the city, county, and State of New York, have invented a certain new and useful Improvement in Air-Brakes, of which improvement the following is a specification.

My invention relates to triple valves for automatic air-brake systems; and its object is to provide a valvular mechanism of that general class or type, which shall be of simple, compact, and inexpensive construction and in the operation of which graduation, service, and emergency stops and stops under higher than ordinary pressure may be effected with the greatest practicable promptness and certainty and without liability to failure, derangement, or excessive wear of any of the operative members, and the release of the brakes may be effected either automatically or under the direct control of the engineer.

The improvement claimed is hereinafter fully set forth.

Figure 1:
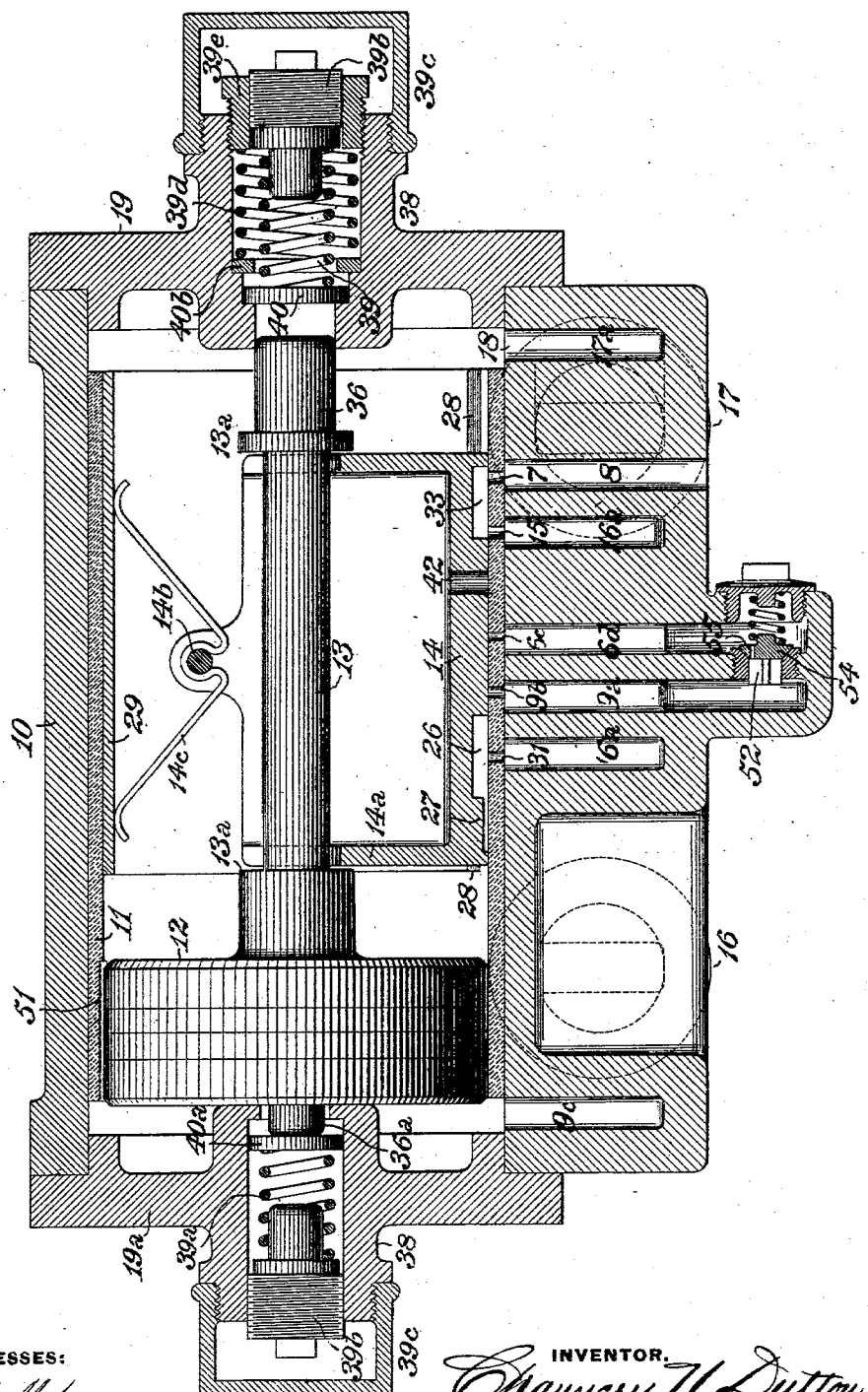
Figure 2:
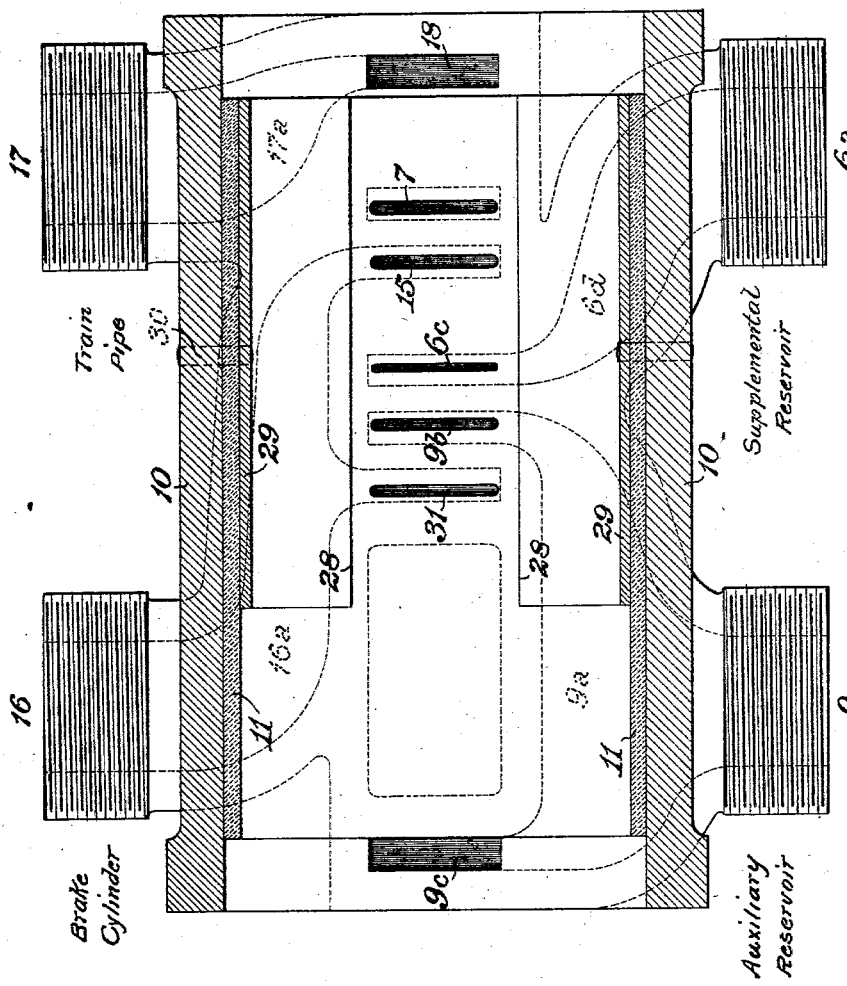
Figure 4:
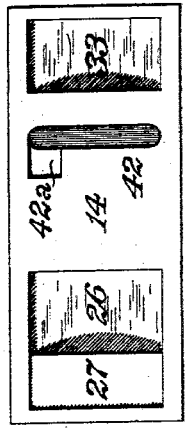
Figure 7:
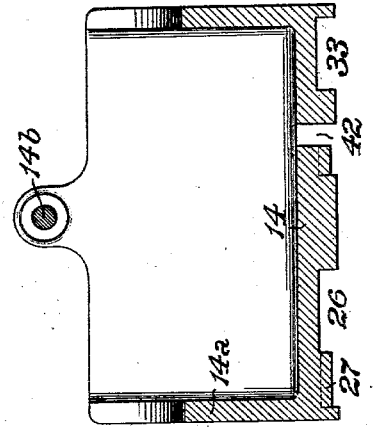
Figure 6:
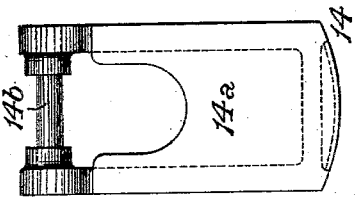
Figure 3:
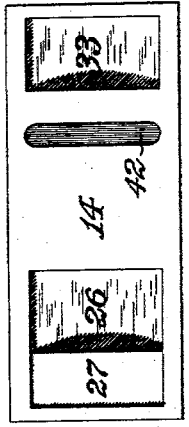
Figure 5:
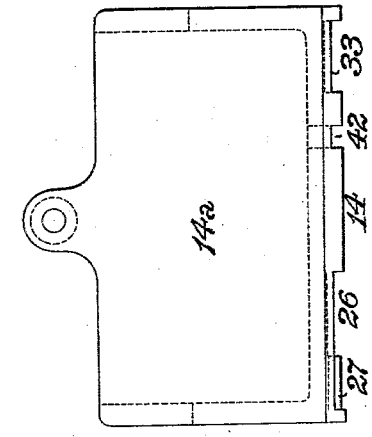

In the accompanying drawings, Figure 1 is a longitudinal central section through a triple valve, illustrating an embodiment of my invention, the parts being shown in release or running position; Fig. 2, a longitudinal section through the valve-casing, the plane of section being at right angles with that of Fig. 1, showing the disposition of the ports, passages, and pipe connections; Fig. 3, a face view of the slide-valve; Fig. 4, a similar view showing a modification; Fig. 5, a side view in elevation of the slide-valve; Fig. 6, an end view of the same; Fig. 7, a longitudinal central section through the same; and Fig. 8, a longitudinal section, in release position, through a triple valve, illustrating a modified form of my invention.

In the practice of my invention the operative mechanism of the triple valve is inclosed within a case or shell 10, which is of substantially cylindrical form and comparatively small volume. A nozzle or tubular connection 16 for the attachment of a pipe leading to a brake-cylinder when the device is installed for service in an automatic air-brake apparatus is cast upon or otherwise fixed to the shell or valve-casing 10. A similar nozzle 17 for a pipe leading to the main air or train pipe is provided, preferably, on the same side with the nozzle 16, a nozzle 9 for a pipe connecting with the auxiliary reservoir, and a nozzle 6ª for a pipe connecting with a supplemental reservoir, the two latter being preferably located on the opposite side of the valve-shell 10, which is lined with a suitable bushing 11 and provided with heads 19 and 19ª, which close its ends. A passage 17ª leads from the train-pipe nozzle 17 to a large admission-port 18 in the casing 10. A branched passage 9ª connects the auxiliary-reservoir nozzle 9 with an admission-port 9ᶜ, located near one end of the valve-casing 10, and with a supply-port 9ᵇ in the valve-bushing 11. A passage 16ª connects the brake-cylinder nozzle 16 with a supply-port 31 and a release-port 15. A passage 6ᵈ connects the supplemental-reservoir nozzle 6ª with a supply-port 6ᶜ, formed in the valve-seat. An exhaust-port 7, formed in the valve-seat, communicates by an exhaust-passage 8 with the atmosphere. The preferred location of ports is that the supply-port 18, connected with the train-pipe, should be at one end—for example, at the right-hand end of the valve-casing 10—and the admission-port 9ᶜ of the auxiliary reservoir should be at the opposite end. The exhaust-port 7 should be near the train-pipe supply-port 18, and the brake-cylinder release-port 15, supplemental-reservoir supply-port 6ᶜ, auxiliary-reservoir supply-port 9ᵇ, and brake-cylinder supply-port 31 should be adjacent to it in the order stated, as shown in the figures.

A movable abutment 12, which is preferably, as shown, in the form of a properly-packed piston, is fitted in the bushing of the valve-casing 10 at one end thereof and is adapted to reciprocate therein and provided with a stem 13, on which are formed collars or shoulders 13ª for moving a slide-valve 14, which is fitted to a seat formed, preferably, on the bushing 11 on the train-pipe side of the piston and embracing the exhaust-port 7, the brake-cylinder release-port 15, the supplemental-reservoir supply-port 6ᶜ, the auxiliary-reservoir supply-port 9ᵇ, and the brake-cylinder supply-port 31 in the order stated. An open frame 14ª, formed on the back of the slide-valve 14, extends to points of contact with the collars 13ª on the stem 13 of the piston 12 and also furnishes bearings for a pin 14$^b$ for the attachment of a spring 14$^c$, the pressure of which holds the valve 14 securely upon its seat. In the face of the valve is a recess 33, which when the valve is in release position connects the release-port 15 of the brake-cylinder with the exhaust-port 7. A quick-action passage 42 in the valve 14 normally opens to the seat, and when the valve is suitably moved registers with the release-port 15 of the brake-cylinder and establishes communication between the brake-cylinder and the train-pipe. Near the end of the valve 14 opposite to that in which the recess 33 is located there is formed a recess 26, which is reduced in depth at and near its outer end by a projection 27, formed on the valve 14. The true rectilineal movement of the valve 14 upon the valve-seat is insured by parallel guides 28, preferably formed in a liner 29, slipped into the bushing 11 and secured by pins 30 or otherwise. A feed-passage 51, which is preferably a groove cut in the bushing 11, opens restricted communication between the train-pipe and the auxiliary reservoir when the valve is in release position, through which compressed air may be fed into the auxiliary reservoir, and provision for feeding the supplemental reservoir is made by a passage 52, preferably formed in the dividing-wall separating the passage 9$^a$ of the auxiliary reservoir from that 6$^d$ of the supplemental reservoir. The passage 52 is preferably fitted with a check-valve 54, through which passes a small opening 55. When the piston 12 is in release position, air can pass from the train-pipe and charge the auxiliary and supplemental reservoirs, and the back-flow from the supplemental to the auxiliary reservoir is restricted. The piston-stem 13 is prolonged beyond the slide-valve to form a stud 36 and beyond the opposite side of the piston 12 to form a stud 36$^a$.

Graduating-spring casings 38 are formed in the heads 19 and 19$^a$, that in the head 19$^a$ containing a graduating-spring 39$^a$ and that in the head 19 containing two graduating-springs 39 and 39$^d$. The spring 39$^d$ bears at its outer end against an adjusting-block 39$^e$ and at its inner end against a ring or open washer 40$^b$, which when the spring is extended bears against a shoulder of the casing 38. The graduating-springs 39 and 39$^a$ bear at their outer ends against adjusting-blocks 39$^b$ and at their inner ends against washers 40 and 40$^a$, respectively, which when the springs are extended bear against and are stopped by shoulders formed in the casings 38. Caps 39$^c$ cover the adjusting-blocks 39$^b$ and 39$^e$. The distance between the washers 40 and 40$^a$ when the springs 39 and 39$^a$ are fully extended somewhat exceeds the total length of the piston-stem 13, measured between the extremities of the studs 36 and 36$^a$.

In the operation of the apparatus the nozzles 17, 9, and 16 of the casing 10 being of course understood to be properly connected by pipes in the ordinary manner with the train-pipe, an auxiliary reservoir, and a brake-cylinder of an automatic air-brake apparatus of the standard Westinghouse or any other brake apparatus operating on the same general principles and the nozzle 6$^a$ connected with a supplemental-auxiliary reservoir, the engineer charges the train-pipe and auxiliary reservoirs and brings the piston into the release or running position shown in Figs. 1 and 8 by admitting air under pressure by the engineer's valve on the locomotive from the main reservoir to the train-pipe, the air so admitted passing through the train-pipe connection 17 and large supply-port 18 into the bore of the valve-bushing 11 of each of the triple valves of the brake system on the train-pipe side of the piston 12. The pressure of the air forces the piston to the left until the stud 36$^a$ of its stem bears against the washer 40$^a$ of the adjacent graduating-spring 39$^a$, thereby uncovering the feed-port 51, through which and through the passage 9$^a$ and its connections the auxiliary reservoir is charged with air at train-pipe pressure. The air also unseats the check-valve 54 and feeds through the passages 52 and 6$^d$ into the supplemental reservoir.

If the engineer opens his valve very slightly, so as to just perceptibly reduce the pressure in the train-pipe below that in the auxiliary reservoir, the spring 39$^a$ will move the piston 12 sufficiently to cover the feeding-in port 51 and the brake-cylinder release-port 15, so as to shut off the communication between the brake-cylinder and the atmosphere, but not sufficiently to uncover the auxiliary-reservoir supply-port 9$^b$ or to bring the stud 36 in contact with the washer 40 in the head 19. A further slight reduction of the pressure in the train-pipe, barely sufficient to overcome the friction of the piston 12 and slide-valve 14, will uncover the auxiliary-reservoir supply-port 9$^b$, so that it will communicate through the valve-recess 26 with the brake-cylinder supply-port 31, and compressed air will feed from the auxiliary reservoir into the brake-cylinder, giving a service application of the brakes. A slight reduction in pressure in the auxiliary reservoir or increase in pressure in the train-pipe will move the piston to the left sufficiently to cover the auxiliary supply-port 9$^b$ and to bring the stem 36$^a$ in contact with the washer 40$^a$, but not sufficiently to compress the graduating-spring 39$^a$ or to uncover the release-port 15, and thus the engineer can move the slide-valve slightly in either direction by varying the train-pipe pressure barely enough to overcome its friction, but not enough to overcome the additional resistance of the graduating-springs 39 and 39$^a$, and thereby accomplish the results attained by the graduating-valve in the ordinary type of triple valve.

The release of the brakes after a service application is effected by the readmission of air to the train-pipe by the engineer in sufficient quantity to move the piston to release position, as in the charging of the auxiliary reservoirs before described.

When it is desired to apply the brakes with greater rapidity and force, making a so-called "quick-action application," as in cases of emergency, a more sudden and greater reduction of train-pipe pressure is made by the engineer than is necessary to effect a service application, whereupon the pressure in the auxiliary reservoir will move the piston 12 until its stud 36 comes in contact with the washer 40 and compresses the spring 39, so that the washer 40 will bear upon the ring or open washer 40$^b$, and the passage 42 through the slide valve 14 will register with the brake-cylinder release-port 15, opening free communication through the interior of the valve-casing 10 between the train-pipe and the brake-cylinder. Compressed air then flows from the train-pipe through the nozzle 17, the passage 17$^a$, the train-pipe admission-port 18, the interior of the valve-casing 10, the passage 42 in the valve, the release-port 15, the passage 16$^a$, and the nozzle 16 into the brake-cylinder. The projection 27 in the recess 26 of the valve 14 then stands over the supply-port 31 of the brake-cylinder and restricts the flow of air from the auxiliary reservoir into the brake-cylinder, the supply of air from the auxiliary reservoir to the brake-cylinder being thus throttled and retarded, so that a large proportion of the air in the train-pipe can enter the brake-cylinder. The flow of air from the train-pipe into the brake-cylinder still further reduces the pressure in the train-pipe, so that the auxiliary-reservoir pressure will push the piston 12 and slide-valve 14 still farther, compressing the graduating-spring 39$^d$ and moving the passage 42 of the slide-valve 14 beyond the brake-cylinder release-port 15, so as to cut off communication between the train-pipe and the brake-cylinder and retain compressed air in the latter until the engineer, by admitting compressed air to the train-pipe and raising the pressure therein and in the train-pipe end of the valve-casing 10, causes the piston 12 and valve 14 to move toward the release position. The slide-valve may, if desired, be made so as to automatically return from the position above described to the position of service application of the brakes by making the passage 42 wide relatively to the release-port 15. A construction to accomplish this purpose is shown in Fig. 4, in which the passage 42 is provided with a narrow prolongation 42$^a$, which in a quick-action application stands over the brake-cylinder release-port 15, so that there will at such time be a restricted flow of air from the brake-cylinder into the train-pipe end of the valve-casing 10, tending to equalize the pressures therein, and as the pressures begin to equalize the springs 39$^d$ and 39 will move the valve back to the position of service application, automatically reducing the intensity of the brake application to that used in ordinary service braking.

To effect a high-service or maximum power application of the brakes, the engineer suddenly and considerably reduces the train-pipe pressure, as above described, so that the piston 12 and slide-valve 14 will move sharply, the stud 36 will come in contact with the washer 40 and compress the graduating-spring 39, the passage 42 in the valve will register with the brake-cylinder release-port 15, and the train-pipe pressure will flow into the brake-cylinder, after which the engineer will still further reduce the pressure in the train-pipe, so as to cause a yet greater difference between the pressures on the two sides of the piston 12, whereupon the piston 12 will move through its extreme traverse, bringing the right-hand collar 13$^a$ in contact with the casing-head 19, compressing the springs 39 and 39$^d$ to their fullest extent and moving the valve 14 to the extreme limit of its traverse to the right, so that the supplemental-reservoir port 6$^c$ will communicate through the passage 26 in the valve 14 with the brake-cylinder supply-port 31, and the air from the supplemental reservoir, in addition to that from the auxiliary reservoir, will flow into the brake-cylinder, which has already received a portion of the air from the train-pipe, thus giving the maximum intensity of brake application. Inasmuch as the passage 42 of the valve will have passed beyond the brake-cylinder release-port 15 there will be no communication between the brake-cylinder and the train-pipe, and the brake application of maximum power will continue until the engineer admits compressed air to the train-pipe, thereby moving the piston 12 and valve 14 toward the release position; but if the passage 42 be of the form shown in Fig. 4 then the valve will automatically return to the position of service application and the intensity of application of the brakes will automatically return to that used in service braking, as before described.

Fig. 8 illustrates a structural modification in which a check-valve chamber 43 is formed on the back of the valve 14, surrounding the passage 42 and containing a check-valve 49, which is normally held upon a seat in said chamber by a spring 50, so as to close the check-valve opening 43$^a$. In this modified form a service application of the brakes is effected in the same manner as heretofore described. When it is desired to make a quick-action application, the engineer quickly and sharply reduces the pressure in the train-pipe, the piston 12 and valve 14 move sharply, bringing the stem 36 in contact with the washer 40, compressing the graduating-spring 39 until the washer 40 rests upon the open washer or ring 40$^b$, and the passage 42 registers with the brake-cylinder release-port 15, whereupon the pressure in the train-pipe will unseat the valve 49 and a portion of the train-pipe air will pass through the opening 43$^a$, the check-valve chamber 43, and the registering-passage 42 and brake-cylinder release-port 15 into the brake-cylinder, and thereafter the closing of the valve 49 by the spring 50 and the air-pressure in the chamber 43 will prevent the escape of the compressed air from the brake-cylinder into the train-pipe.

I claim as my invention and desire to secure by Letters Patent—

1. The combination, in a triple-valve mechanism for automatic air-brakes, of a movable abutment adapted to be traversed in opposite directions by train-pipe pressure and by auxiliary-reservoir pressure respectively, and a valve actuated by the movable abutment and having a recess controlling communication between the auxiliary-reservoir and brake-cylinder connections, a projection in said recess whereby its delivery capacity is restricted after the valve has made a traverse greater than that effected in service applications of the brake, a recess controlling communication between the brake-cylinder connection and the exhaust-passage, and a quick-action passage controlling communication between the train-pipe connection and the brake-cylinder connection.

2. The combination, in a triple-valve mechanism for automatic air-brakes, of a movable abutment adapted to be traversed in opposite directions by train-pipe pressure and by auxiliary-reservoir pressure respectively, and a valve actuated by the movable abutment and having a recess controlling communication between the auxiliary-reservoir and brake-cylinder connections, a recess controlling communication between the brake-cylinder connection and the exhaust-passage, and a quick-action passage which, in one position of the movable abutment and valve, establishes communication between the train-pipe connection and the brake-cylinder connection, and which, by a further traverse, is moved out of the line of such communication, so that train-pipe pressure may be retained in the brake-cylinder until release is desired and effected.

3. The combination, in a triple-valve mechanism for automatic air-brakes, of a movable abutment adapted to be traversed in opposite directions by train-pipe pressure and by auxiliary-reservoir pressure respectively, and a valve actuated by the movable abutment and having a recess controlling communication between the auxiliary-reservoir and brake-cylinder connections, a recess controlling communication between the brake-cylinder connection and the exhaust-passage, and a quick-action passage which, in one position of the movable abutment and valve, establishes communication between the train-pipe connection and the brake-cylinder connection, and which, by a further traverse, is moved out of the line of such communication, and a lateral extension on said passage through which a restricted communication may be maintained between the brake-cylinder connection and train-pipe connection after such further traverse.

4. The combination, in a triple-valve mechanism for automatic air-brakes, of a movable abutment adapted to be traversed in opposite directions by train-pipe pressure and by auxiliary-reservoir pressure respectively, a valve actuated by the movable abutment and having a recess controlling communication between the auxiliary-reservoir and brake-cylinder connections, a recess controlling communication between the brake-cylinder connection and the exhaust-passage, and a quick-action passage adapted to communicate, in one position of the valve, with the brake-cylinder connection, a check-valve chamber inclosing the receiving end of the quick-action passage, and an inwardly-opening check-valve, normally seated in said chamber and controlling communication between the same and the train-pipe connection.

5. The combination, in a triple-valve mechanism for automatic air-brakes, of a case or shell having train-pipe, main auxiliary-reservoir, supplemental auxiliary-reservoir, and brake-cylinder connections, and an exhaust-passage, a movable abutment adapted to be traversed in opposite directions in the case by train-pipe pressure and by auxiliary-reservoir pressure respectively, and a valve actuated by the movable abutment and having a recess controlling communication between the main and supplemental auxiliary-reservoir connections and the brake-cylinder connection, a recess controlling communication between the brake-cylinder connection and the exhaust-passage, and a quick-action passage controlling communication between the train-pipe connection and the brake-cylinder connection.

6. The combination, in a triple-valve mechanism for automatic air-brakes, of a case or shell having train-pipe, main auxiliary-reservoir, supplemental auxiliary-reservoir and brake-cylinder connections, and an exhaust-passage, a check-valved passage between the main and supplemental auxiliary-reservoir connections, a movable abutment adapted to be traversed in opposite directions in the case by train-pipe pressure and by auxiliary-reservoir pressure respectively, and a valve actuated by the movable abutment and having a recess controlling communication between the main and supplemental auxiliary-reservoir connections and the brake-cylinder connection, a recess controlling communication between the brake-cylinder connection and the exhaust-passage, and a quick-action passage controlling communication between the train-pipe connection and the brake-cylinder connection.

7. The combination, in a triple-valve mechanism for automatic air-brakes, of a case or shell having train-pipe, main auxiliary-reservoir, supplemental auxiliary-reservoir, and brake-cylinder connections, and an exhaust-passage, a movable abutment adapted to be traversed in opposite directions in the case by train-pipe pressure and by auxiliary-reservoir pressure respectively, a valve actuated by the movable abutment and having a recess controlling communication between the main and supplemental auxiliary-reservoir connections and the brake-cylinder connection, a recess controlling communication between the brake-cylinder connection and the exhaust-passage, and a quick-action passage controlling communication between the train-pipe connection and the brake-cylinder connection, graduating-springs on opposite sides of the movable abutment, each of which is adapted to exert pressure upon said movable abutment after a limited range of traverse thereof toward it has been made, and a supplemental graduating-spring against which the movable abutment bears in the latter portion of its maximum range of traverse in brake application.

8. In an automatic valve mechanism for air-brakes, the combination of a valve-case, having connections and ports communicating with the brake-cylinder, the train-pipe, and the auxiliary reservoir, and an exhaust-port, a valve adapted to cover and uncover the ports and connect and disconnect the brake-cylinder and the auxiliary reservoir, the brake-cylinder and the train-pipe, and the brake-cylinder and the exhaust-port, a piston having a stem connected to and projecting in opposite directions from the valve, studs on the ends of the piston-stem adapted to engage graduating-springs at opposite limits of the stroke of the valve, and graduating-springs at each side of the valve, which, when extended, are separated at a distance exceeding the length of the piston-stem and studs, substantially as set forth.

CHAUNCEY N. DUTTON.

Witnesses:
FRED HARRIS,
F. N. GLEASON.